Patented May 20, 1941

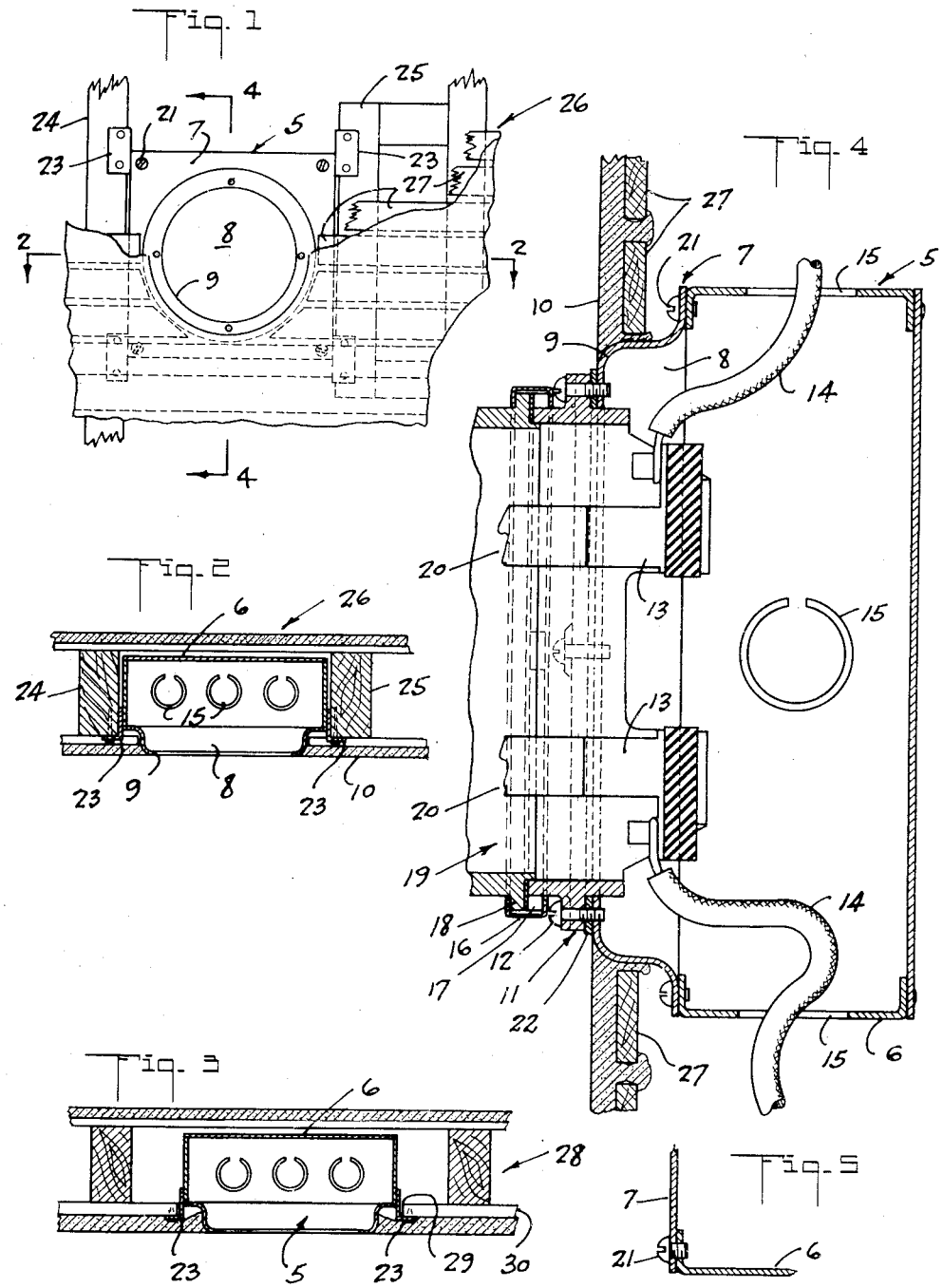

2,242,646

UNITED STATES PATENT OFFICE 2,242,646

ELECTRIC METER SOCKET SUPPORT

Peter Ficker, Pomona, Calif.

Application August 12, 1938, Serial No. 224,538

6 Claims. (Cl. 175—225)

This invention relates to electric meters that are used to measure electrical energy consumed in connection with buildings, such as dwellings, shops or stores, or other premises, and more particularly to a means for mounting such meters.

Such meters are usually supported on an external wall of the building by the aid of a meter socket which extends into a recess formed in the wall and defined by a meter trough. Such meter troughs are usually secured to the building wall and have an opening in the front face to receive the meter socket and meter. Connections to the meter socket are made within the meter trough from cables which extend through the wall and into the trough.

It is one of the objects of this invention to improve in general the supporting structures for electric meter installations of this character.

It is another object of the invention to make it possible to use the wall space to better advantage for the housing of the meter and its connections.

It is another object of this invention to provide a meter trough of a character which will facilitate the plastering operation incident to finishing the wall in which it is mounted.

It is still another object of this invention to provide a meter trough having a ring for accommodating a meter socket, the ring being so fashioned as to exclude moisture from the trough or socket.

This invention possesses many other advantages and has other objects which may be made more easily apparent from a consideration of an embodiment of the invention. For this purpose there is shown one form in the drawing accompanying and forming part of the present specification. This form will now be described in detail, illustrating the general principles of the invention; but it is to be understood that this detailed description is not to be taken in a limiting sense, since the scope of the invention is best defined by the appended claims.

Referring to the drawing:

Figure 1 is an elevational view of the meter trough secured in place in a wall structure;

Fig. 2 is a section as seen on line 2—2 of Fig. 1;

Fig. 3 is a section similar to Fig. 2, showing the meter trough in different type of wall structure;

Fig. 4 is a section on an enlarged scale as seen on lines 4—4 of Fig. 1, and showing a meter socket and meter mounted on the trough; and Fig. 5 is a fragmentary section, showing the means of fastening the cover to the trough.

In the drawing, the meter trough is indicated by 5 and comprises a rectangular box 6 formed of light sheet metal, which is adapted to be supported on the frame work of the wall. The cover 7 of the box is removable, being held in place in any convenient manner, as by screws 21, and is provided with a large central opening 8, defined by an annular flange 9. This flange forms an opening through the wall 10 into the box.

The meter socket 11 which forms no part of the present invention, is firmly secured to the annular flange 9, as by screws 12, an appropriate gasket 22 being interposed between the flange and the socket. The meter socket supports a plurality of spring contacts 13 which are connected to the power mains in any appropriate manner, as by leads 14 which enter the meter trough through appropriate openings 15. These may be of the knockout type, and several of them are provided in the top and bottom as well as the sides, to accommodate various types of connections.

The meter is secured to the meter socket 11 by a clamp ring 16 which embraces flange 17 on the outer face of the meter socket and flange 18 on the inner end of the meter case 19. When the clamp ring 16 is secured in place on the meter socket, it serves in an obvious manner to prevent removal of screws 12. The meter in this instance is shown as provided with contacts 20, which engage contacts 13 when the meter is mounted on the meter socket. The described structure provides means whereby a meter may be readily removed or mounted, or replaced, without breaking any connections or defacing the wall surface.

As shown in Figs. 1, 2 and 3, the meter trough 5 is provided with bent plates forming mounting feet 23 at each outside corner, by means of which the trough may be secured to the wall structure. In Figs. 1 and 2 the meter trough is shown as attached to a stud 24 and a false stud 25 within a wall structure 26 by means of nails or screws through the mounting feet 23. The lath 27 are put on the wall after the trough is in place and are cut to closely approach flange 9. The meter trough may be similarly mounted in other types of wall structures. For instance, a sheathed wall 28 is shown in Fig. 3; by cutting an opening 29 in the sheathing 30 approximately the size of the box and securing the mounting feet 23 to the sheathing 30 by nails or screws, the meter trough can be readily mounted therein. In any case, the meter trough forms a recess in the wall for the reception of the meter connections, as shown in Fig. 4.

The annular flange 9 is drawn so that it extends outwardly from the cover 7 such a distance that when the box is attached to the wall, the face of the flange is flush with the finished surface of the wall. This greatly facilitates the plastering operation, and moisture descending the exterior face of the wall 10 will not be deflected inwardly. Further, that the face of the box 6 adjacent the exterior wall 10 is spaced from the interior surface of the wall; thus any moisture descending this interior surface will not reach the box 6, but will contact the annular flange 9 and be shunted around the box. Further, the draw to flange 9 provides additional space within the trough for the meter connections, as clearly shown in Fig. 4.

What is claimed is:

1. A meter trough for supporting an electric meter socket on a building wall, comprising a sheet metal box having a removable front cover and adapted for mounting within the wall to form a recess for accommodation of meter connections, an outwardly drawn, annular flange on said cover defining a circular opening through which a portion of the meter socket is adapted to pass, means for supporting said box on the wall so that the outer face of the flange is substantially flush with the exterior surface of said wall, the outer surface of said flange extending radially inward, and means on said flange for rigidly securing the socket thereto in supported relation.

2. A meter trough for supporting an electric meter socket on a building wall, comprising a sheet metal box having a removable front cover and adapted for mounting within the wall to form a recess for accommodation of meter connections, an outwardly drawn, annular flange on said cover defining a circular opening through which a portion of the meter socket is adapted to pass, means for supporting said box on the wall so that the outer face of the flange is substantially flush with the exterior surface of said wall, and means on said flange for detachably securing the socket thereto in supported relation, the draw to said flange being such as to space the main body of the cover from an interior surface within the wall to substantially prevent entrance into the box of moisture descending such interior surface.

3. In a meter trough for supporting an electric meter socket on a building wall composed of spaced exterior and interior wall portions, a sheet metal trough having a removable front cover and adapted for mounting between said wall portions to form a recess for accommodation of meter connections, an annular flange disposed in spaced relation to the main body of the cover and connected thereto by a substantially annular, integral wall, said flange defining an opening through which a portion of the meter socket is adapted to pass, means for supporting said box on the wall so that the outer face of the flange is substantially flush with the exterior surface of the exterior wall portion, the height of said integral wall being such that the main body of the cover being thereby spaced from the interior surface of the exterior wall portion, whereby moisture descending said interior surface is shunted around the box by said annular connecting wall.

4. In a device of the character described, a shallow box adapted to be mounted in a wall structure between the opposite walls thereof, a removable front cover for the box, said cover having a large circular opening defined by an outwardly drawn annular flange, mounting lugs on said box adapted to support said box in the wall structure so that the outer face of said flange is substantially flush with the finished surface of one of said walls, said flange being of such height as to space the main body of the cover from the interior surface of said wall, said flange serving to provide increased depth for the box to accommodate the meter connections, said flange having a radially inwardly extending outer face, and means on said flange for rigidly securing a meter socket in supported relation to said outer face.

5. A meter trough for supporting an electric meter socket on the wall of a building, said trough having a rear portion forming a wall recess in which the meter connections may be accommodated, a circular opening in the front defined by a raised flange joined to the rear portion and having a deep draw, and means for supporting said meter trough on the wall so that the outer face of the flange is substantially flush with the outer wall surface, the depth of said draw being such that the joint between the flange and said rear portion is spaced from the inside surface of the wall, said flange being adapted to have a meter socket secured thereto.

6. A meter trough for supporting an electric meter socket on the wall of a building, said trough having a rear portion forming a wall recess in which the meter connections may be accommodated, an apertured front wall, a flange disposed in front of said wall and having an outer face extending radially inward and adapted to have a meter socket secured thereto, said flange defining an internal aperture through which a portion of the meter socket is adapted to pass, an annular wall connecting said flange to said front wall, and means for supporting said meter trough on the wall so that the outer face of the flange is substantially flush with the outer wall surface, the height of said annular wall being such that said front wall is spaced inwardly from the inner surface of the wall.

PETER FICKER.